United States Patent
Miyazaki

(10) Patent No.: US 8,660,729 B2
(45) Date of Patent: Feb. 25, 2014

(54) LIMP-HOME MODE CONTROL DEVICE FOR ELECTRIC VEHICLE

(75) Inventor: Shogo Miyazaki, Hamamatsu (JP)

(73) Assignee: Suzuki Motor Corporation (JP)

( * ) Notice: Subject to any disclaimer, the term of this patent is extended or adjusted under 35 U.S.C. 154(b) by 32 days.

(21) Appl. No.: 13/285,781

(22) Filed: Oct. 31, 2011

(65) Prior Publication Data

US 2012/0123622 A1  May 17, 2012

(30) Foreign Application Priority Data

Nov. 11, 2010  (JP) ................................. 2010-253021

(51) Int. Cl.
*B60L 3/04* (2006.01)
*B60L 3/00* (2006.01)

(52) U.S. Cl.
CPC ................. *B60L 3/04* (2013.01); *B60L 3/0023* (2013.01); *B60L 3/0046* (2013.01); *B60L 3/003* (2013.01); *B60L 3/0061* (2013.01); *B60L 3/0069* (2013.01); *B60L 3/0076* (2013.01); *B60L 3/0084* (2013.01); *Y10S 903/906* (2013.01)
USPC .......................... 701/22; 180/65.285; 903/906

(58) Field of Classification Search
CPC ....... B60L 3/0023; B60L 3/0046; B60L 3/04; B60L 3/003; B60L 3/0061; B60L 3/0069; B60L 3/0076; B60L 3/0084; Y02T 10/7005
USPC ............................ 701/22; 180/65.285; 903/906
See application file for complete search history.

(56) References Cited

U.S. PATENT DOCUMENTS

| 8,020,650 | B2 | 9/2011 | Van Maanen et al. |
| 8,249,770 | B2 * | 8/2012 | Bennewitz ................... 701/29.2 |
| 8,307,928 | B2 * | 11/2012 | Mack ........................ 180/65.285 |
| 8,395,350 | B2 * | 3/2013 | Sloan et al. .................... 320/105 |

FOREIGN PATENT DOCUMENTS

| CN | 101841185 A | 9/2010 |
| JP | 02-290106 | 11/1990 |
| JP | 08-294202 | 11/1996 |
| JP | 2008284952 A | 11/2008 |
| JP | 2009-071901 | 4/2009 |

OTHER PUBLICATIONS

First Office Action corresponding to Chinese Application No. 201110353641.1 issued Dec. 4, 2013.

* cited by examiner

*Primary Examiner* — James Trammell
*Assistant Examiner* — Todd Melton
(74) *Attorney, Agent, or Firm* — Myers Bigel Sibley & Sajovec, P.A.

(57) ABSTRACT

A control device for a vehicle includes a motor configured to drive wheels, a high-voltage battery configured to supply electric power to the motor, and a battery charger configured to charge the high-voltage battery by using a power supply outside the vehicle. The control device further includes a failure detection unit configured to detect a specific failure, and a drive prohibition unit configured to prohibit driving of the vehicle. The drive prohibition unit prohibits the driving of the vehicle when the failure is detected by the failure detection unit in an initial check before start of driving of the vehicle and when the high-voltage battery is charged by using the power source outside the vehicle immediately before the initial check.

2 Claims, 2 Drawing Sheets

LIMP-HOME MODE CONTROL DEVICE FOR ELECTRIC VEHICLE

CROSS-RELATED APPLICATIONS

This application claims priority from Japanese Patent Application No. 2010-253021; filed Nov. 11, 2010, the disclosure of which is incorporated herein by reference in its entirety.

BACKGROUND OF THE INVENTION

The present invention relates to a control device for a vehicle which is an electric vehicle or a plug-in hybrid vehicle. More specifically, the present invention relates to a control device for a vehicle including a traction motor, a high-voltage battery for supplying electric power to the motor, and a battery charger for charging the high-voltage battery by using an external power supply.

An electric vehicle or a plug-in hybrid vehicle has been known which is configured such that power obtained from a domestic power supply is charged into a high-voltage battery and which is capable of traveling by using only the power in the high-voltage battery.

Such a vehicle includes a control device (also referred to as an "integrated ECU") configured to manage information on components including a motor, an engine, a battery, and the like, and to perform integrated control thereof. Alternatively, in such a vehicle, the aforementioned function is often imparted to a control device for any of these components.

In addition, as disclosed in JP 2-290106 A, such a vehicle is generally configured such that the drive control and the control of charging using an external power supply are performed separately from each other to prevent malfunction.

Furthermore, the vehicle being the electric vehicle or the plug-in hybrid vehicle involves external charging which is not carried out by conventional gasoline-powered vehicles. Accordingly, there are various conceivable patterns of vehicle conditions at the time of a failure, for example:
(1) Whether the failure occurs in the course of carrying out a driving cycle or an external charging cycle;
(2) Whether the failure occurs before the start of any of these cycles;
(3) Whether the cycle previously carried out was the driving cycle;
(4) Or the cycle previously carried out was the external charging cycle.
Hence it may be impossible to carry out the optimum fail safe process without considering these factors.

Now, a case of occurrence of a failure that requires limp-home mode driving will be considered as an example. Such a failure may be a failure of a DC/DC converter or a high-voltage battery-related component which may incur significant degradation in mileage, or a failure of a drive system or a brake-related component which may cause significant power output limitation, for instance.

If the failure is detected in the course of the driving cycle, it is disadvantageous for a driver to stop the vehicle immediately at that place. Therefore, it is obvious that the limp-home mode driving should be permitted in this case.

Meanwhile, if the permission in the event of the failure in the course of the driving cycle as described above is similarly applied to a case in which the failure is detected before the start of the driving cycle, then the vehicle will fall into the limp-home mode driving immediately after the start of the drive. Therefore, the vehicle may be stopped before reaching a place where the vehicle has no possibility of a collision with another vehicle, and does not obstruct the traffic. In this case, it is not always appropriate to permit the driving of the vehicle.

On the other hand, there may also be a case in which the driver has noticed an anomaly already and he or she may be stopping the vehicle temporarily and attempting to restart. For this reason, it is not always appropriate to prohibit the driving of the vehicle when the failure was detected before the start of the driving cycle.

One of objects of the limp-home mode driving is to move the vehicle to a place where the vehicle has no possibility of a collision with another vehicle, and does not obstruct traffic. In the above-mentioned cases, the appropriateness to permit the start of driving of the vehicle should be determined based on whether or not the vehicle is located at a place at the detection of the failure where the vehicle has no possibility of a collision with another vehicle, and does not obstruct the traffic, and whether or not the vehicle is in a condition in which the vehicle has no possibility of collision with another vehicle, and does not obstruct the traffic.

To attain this object, a diagnosis of a failure and the fail safe process must be executed not only based on the information on the driving cycle or the charging cycle being carried out at the moment, but also in consideration of the information on the driving cycle or the external charging cycle executed in the previous session.

To solve this problem, JP 8-294202 A proposes a method applicable to an electric vehicle including a driving controller and a charging controller, the method being configured to transmit failure detection information detected by one of the controllers to the other controller. Meanwhile, JP 2009-71901 A proposes a method of diagnosing a short-circuit failure of a charging conductor while a vehicle is being driven, and stopping a system after the stop of the vehicle, for example.

However, the above-described references, JP 8-294202 A and JP 2009-71901 A, have the following problems.

First, an object of the above-described JP 8-294202 A and the like is to expand a failure detection range of a main control circuit by exchanging the failure diagnosis information between the driving controller and the charging controller. Therefore, the technique according to JP 8-294202 A has a disadvantage that this technique is not intended for a system including a control device which is the integrated ECU configured to carry out the driving control and the charging control with the same controller.

Moreover, the above-described JP 8-294202 A and the like do not particularly consider the fail safe process after the detection of the failure, and therefore cannot solve the aforementioned problem.

An object of the above-described JP 2009-71901 A is also to expand a failure detection range by executing a failure diagnosis of components necessary for external charging while the vehicle is running, and thereby to further improve safety in that driving cycle. Therefore, the technique according to JP 2009-71901 A has a disadvantage that this technique cannot solve the aforementioned problem.

SUMMARY OF THE INVENTION

An object of the present invention is to prohibit driving when a high-voltage battery is being charged by using a power supply outside the vehicle, and to achieve a fail safe process suitable for a condition of the vehicle.

The present invention provides a control device for a vehicle including a motor configured to drive wheels, a high-voltage battery configured to supply electric power to the motor, and a battery charger configured to charge the high-voltage battery by using a power supply outside the vehicle. The control device includes a failure detection unit configured to detect a specific failure, and a drive prohibition unit configured to prohibit driving of the vehicle. In the control device, the drive prohibition unit prohibits the driving of the vehicle when the failure is detected by the failure detection unit in an initial check before start of driving of the vehicle and when the high-voltage battery is charged by using the power source outside the vehicle immediately before the initial check.

When a serious failure is detected in the initial check, the place where it is possible to charge the high-voltage battery by using the power supply outside the vehicle can be considered as a place where the vehicle has no possibility of a collision with another vehicle, and does not obstruct traffic. Therefore, if the high-voltage battery is being charged by using the power supply outside the vehicle, then it is desirable not to drive the vehicle in light of the fail safe process.

The present invention is configured to prohibit driving of the vehicle when the high-voltage battery of the vehicle is being charged by using a power supply outside vehicle. Accordingly, it is possible to achieve the fail safe process suitable for the condition of the vehicle.

DETAILED DESCRIPTION OF PREFERRED EMBODIMENTS

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

Figure 2:
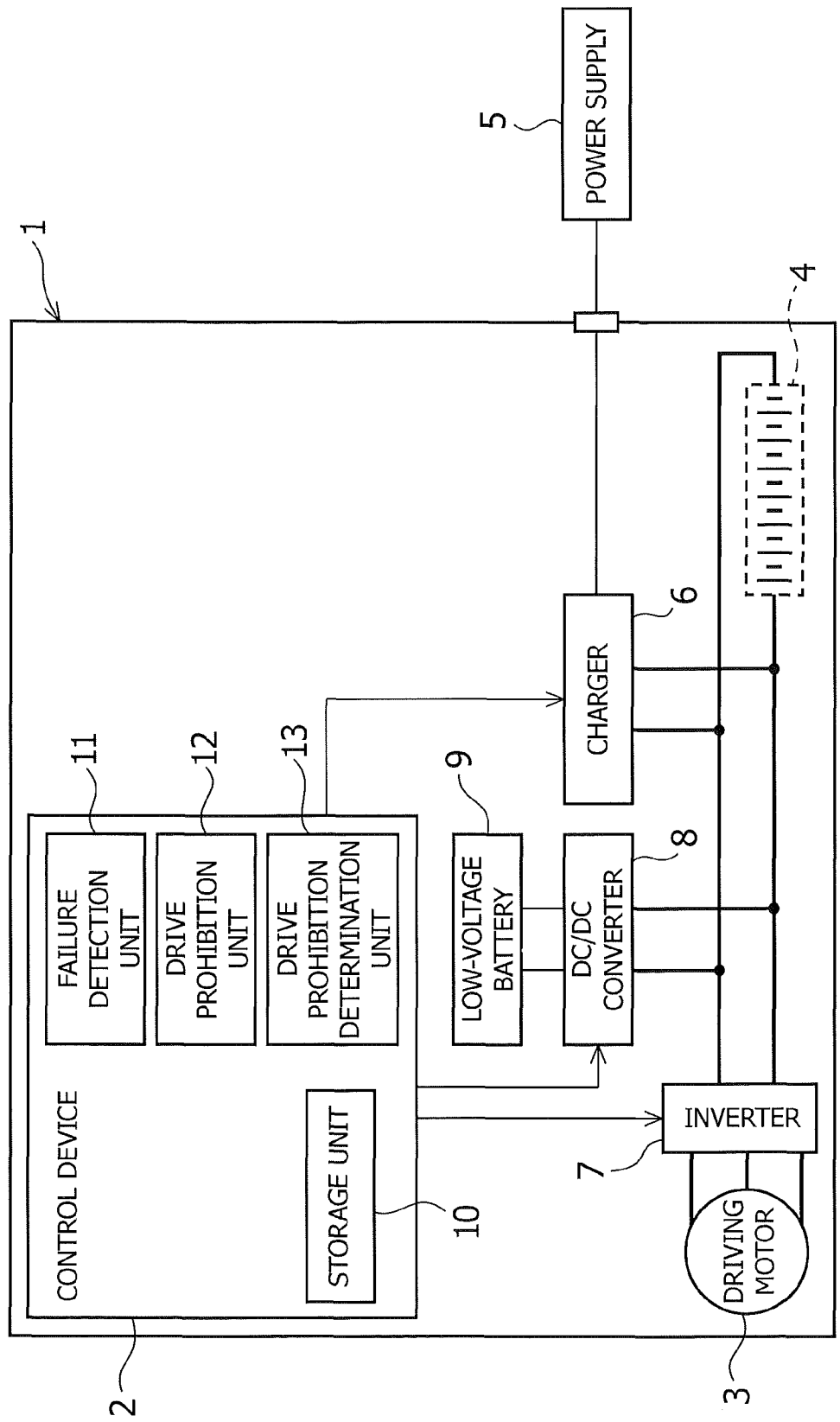
FIG. 2 is a system diagram of the control device for a vehicle according to the embodiment.

In FIG. 2, reference numeral 1 denotes a vehicle which is an electric vehicle or a plug-in hybrid vehicle. Reference numeral 2 denotes a control device for the vehicle 1.

As shown in FIG. 2, the control device 2 for the vehicle 1 includes a motor 3 configured to drive wheels (not shown), a high-voltage battery 4 configured to supply electric power to this motor 3, and a battery charger 6 configured to charge the high-voltage battery 4 by using a power supply 5 outside the vehicle.

In the control device 2 for the vehicle 1, the high-voltage battery 4 is connected to an inverter 7, a DC/DC converter 8, and a battery charger 6 consisting of an in-vehicle charger. The driving motor 3 is controlled by the inverter 7. Meanwhile, a voltage of the high-voltage battery 4 is stepped down by the DC/DC converter 8, and the electric power is supplied to a low-voltage battery (also referred to as a "12-V battery") 9 and electric loads.

Then, the battery charger 6 converts an alternating current from the power supply 5 outside the vehicle into a direct current, and charges the high-voltage battery 4.

At this time, the inverter 7, the DC/DC converter 8, and the battery charger 6 made of the in-vehicle charger are subjected to integrated control by the control device 2 for the vehicle 1.

Meanwhile, the present invention is configured to execute the control to be described below when a failure such as significant degradation in mileage or significant power output limitation which requires limp-home mode driving is detected at an initial check stage before the start of driving of the vehicle 1 being either an electric vehicle or a plug-in hybrid vehicle configured to charge the high-voltage battery 4 by using the power supply 5 outside the vehicle.

From the viewpoint that a place where external charging can be carried out is supposed to be a place where the vehicle has no possibility of collision with another vehicle, and does not obstruct traffic, a determination is made as to whether or not a session previously carried out is an external charging cycle. If the session previously carried out is a driving cycle, the start of driving of the vehicle is permitted. On the other hand, if the session previously carried out is an external charging cycle, then the start of driving of the vehicle is prohibited. In this way, it is possible to achieve a fail safe process suitable for a condition of the vehicle.

Specifically, the control device 2 of the vehicle 1 includes a failure detection unit 11 configured to detect a specific failure, and a drive prohibition unit 12 configured to prohibit driving of the vehicle 1. When the failure is detected by the failure detection unit 11 in the initial check before start of driving of the vehicle 1, and when the high-voltage battery 4 is charged by using the power source 5 outside the vehicle immediately before the initial check, the drive prohibition unit 12 prohibits driving of the vehicle 1.

To be more specific, as shown in FIG. 2, the control device 2 for the vehicle 1 incorporates a storage unit 10 configured to store information, the failure detection unit 11 configured to detect the specific failure, and the drive prohibition unit 12 configured to prohibit driving of the vehicle 1. The information to be stored in the storage unit 10 is the information indicating whether the session carried out immediately before the initial check is the driving cycle or the external charging cycle to charge the high-voltage battery 4 by using the power supply 5.

Then, the drive prohibition unit 12 of the control device 2 for the vehicle 1 prohibits driving of the vehicle 1 when the failure is detected by the failure detection unit 11 in the initial check before start of driving of the vehicle 1 and when the information stored in the storage unit 10 indicates the charging cycle.

Accordingly, when a serious failure is detected in the initial check, the place where it is possible to charge the high-voltage battery 4 by using the power supply 5 outside the vehicle can be considered as a place where the vehicle has no possibility of collision with another vehicle, and does not obstruct traffic. Therefore, it is desirable in light of the fail safe process not to drive the vehicle when the high-voltage battery 4 is charged by using the power supply 5 outside the vehicle.

The present invention is configured to prohibit driving of the vehicle when the high-voltage battery 4 is charged by using the power supply 5 outside the vehicle. Therefore, it is possible to achieve a fail safe process suitable for the condition of the vehicle.

In addition, the specific failure is a state of failure in which it is necessary to switch the driving of the vehicle 1 into limp-home mode driving.

In the state of failure that requires switching of the driving of the vehicle 1 to the limp-home mode driving, such as the state of failure in which there is a prediction to degrade the mileage significantly or to cause significant limitation of a driving force, it is highly likely that the vehicle becomes incapable of running immediately after the start of the drive, and that the vehicle is stopped at a place where the vehicle has a possibility of a collision with another vehicle, or may obstruct traffic.

Accordingly, if the vehicle is located at a place where the vehicle has no possibility of collision with another vehicle, and does not obstruct the traffic, then it is desirable in light of the fail safe process not to drive the vehicle.

The present invention prohibits the driving of the vehicle when there is the prediction to degrade the mileage significantly or to cause significant limitation of the driving force. Therefore, it is possible to achieve the fail safe process suitable for the condition of the vehicle.

The control device 2 for the vehicle 1 further includes a drive prohibition determination unit 13 configured to determine whether or not the vehicle 1 is in a condition capable of performing adequate evacuation drive. The drive prohibition unit 12 does not prohibit the driving when the drive prohibition determination unit 13 determines that the vehicle 1 is in a condition capable of performing adequate evacuation drive, even if the failure is detected by the failure detection unit 11 and the high-voltage battery 4 is charged by using the power source 5 outside the vehicle immediately before the initial check.

Specifically, as shown in FIG. 2, the control device 2 for the vehicle 1 incorporates, for example, a drive prohibition determination unit 13 configured to determine whether or not the vehicle 1 is in a condition capable of performing adequate evacuation drive.

Moreover, even when the failure is detected by the failure detection unit 11 and when the information stored in the storage unit 10 indicates the external charging cycle, the drive prohibition unit 12 of the control device 2 for the vehicle 1 does not prohibit the driving of the vehicle 1 when the drive prohibition determination unit 13 determines that the vehicle 1 is in a condition capable of performing the adequate evacuation drive.

For example, when it is impossible to charge the low-voltage battery 9 which is the 12-V battery due to a failure of the DC/DC converter 8, the driving of the vehicle 1 is not prohibited if the vehicle 1 turns out to be in a condition capable of performing the adequate evacuation drive on the basis of the degree of voltage reduction in the low-voltage battery 9, or the like. Therefore, it is possible to achieve the fail safe process suitable for the condition of the vehicle.

Figure 1:
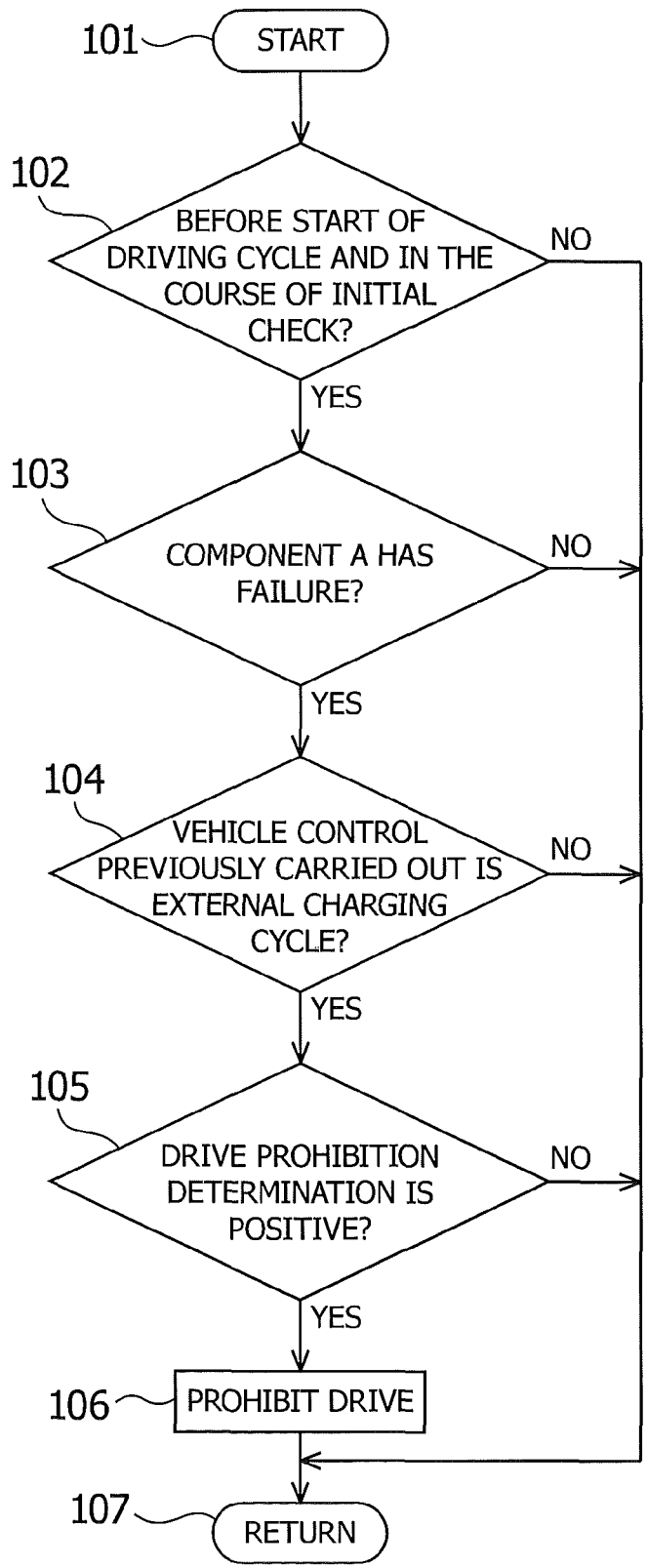
FIG. 1 is a control flowchart of a control device for a vehicle according to an embodiment of the present invention.

Next, operations of the invention will be described with reference to a control flowchart of the control device 2 for the vehicle 1 shown in FIG. 1.

When a control program for the control device 2 for the vehicle 1 is started (101), the control device 2 proceeds to a determination (102) as to whether or not the vehicle 1 is in the state before the start of the driving cycle and in the course of the initial check. When the determination (102) turns out to be NO in this determination as to whether or not the vehicle 1 is in the state before the start of the driving cycle and in the course of the initial check, the process goes to a return step (107) to be described later, and this process session is terminated.

When the determination (102) turns out to be YES, the process goes to a determination (103) as to whether or not a component A has a failure.

Here, the component A is a component of which failure may result in the limp-home mode driving due to significant degradation in the mileage or significant power output limitation. In addition, the determination as to whether or not there is a failure includes not only the case in which the failure is determined to be present in the initial check, but also a case in which a failure detected in the previously executed cycle is not recovered normally.

When the determination (103) turns out to be NO in the determination (103) as to whether or not the component A has a failure, the process goes to the return step (107), and this process session is terminated.

When the determination (103) turns out to be YES, the process goes to a determination (104) as to whether or not the vehicle control previously carried out is an external charging cycle.

Then, when the determination (104) turns out to be NO in the determination (104) as to whether or not the vehicle control previously carried out is an external charging cycle, the process goes to the return step (107), and this process session is terminated.

When the determination (104) turns out to be YES, the process goes to a determination (105) as to whether or not a drive prohibition determination is positive.

It is to be noted that the drive prohibition determination is a determination based on a predetermined determination criteria as to whether or not the conditions of the failure of the component A and the current conditions of the vehicle (such as a remaining amount of the high-voltage battery 4, the degree of voltage reduction of the low-voltage battery 9 being the 12-V battery, and the degree of power output limitation) allow the vehicle 1 to perform the adequate evacuation drive. Here, the drive prohibition determination is positive if the vehicle 1 cannot perform the adequate evacuation drive. Otherwise, the determination is negative.

When the determination (105) turns out to be NO, i.e., when the drive prohibition determination is negative, in the determination (105) as to the drive prohibition determination is positive, the process goes to the return step (107) without prohibiting the driving of the vehicle 1, and this process session is terminated.

When the determination (105) turns out to be YES, i.e., when the drive prohibition determination is positive, the process goes to a process (106) in which the drive prohibition unit 12 of the control device 2 for the vehicle 1 prohibits the driving of the vehicle 1. Thereafter, the process goes to the return step (107), and then this process session is terminated.

It is to be noted that the present invention is not limited to the embodiment described above, and various modifications and changes are possible.

For example, in the embodiment of the present invention, the determination (105) as to whether or not the drive prohibition determination in the program for controlling the control device for the vehicle is positive is configured to determine whether or not the vehicle can perform the adequate evacuation drive by means of the drive prohibition determination, and to thus switch the fail safe process.

Instead, it is possible to eliminate the drive prohibition determination and to limit the scope of the component A only to the component of which failure inevitably renders the vehicle 1 incapable of performing the adequate evacuation drive. However, it is still desirable to determine a region and a condition of the failure of the component A in this case as well.

Unlike the above-described configuration of the control flow chart, it is not necessary to monitor the conditions of the vehicle and to carry out the determination as to whether or not it is possible to perform the adequate evacuation drive in this case. Although fail safe control may not be optimum for the state of the vehicle in this case, this configuration can simplify the control and reduce process time required for the initial check.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. A control device for a vehicle including a motor configured to drive wheels, a high-voltage battery configured to supply electric power to the motor, and a battery charger configured to charge the high-voltage battery by using a power supply outside the vehicle, the control device comprising:

a failure detection unit configured to detect a specific failure;

a drive prohibition unit configured to prohibit driving of the vehicle, and a drive prohibition determination unit configured to determine whether or not the vehicle is in a condition capable of performing adequate evacuation drive, wherein the drive prohibition unit prohibits the driving of the vehicle when the failure is detected by the failure detection unit in an initial check before start of driving of the vehicle and when the high-voltage battery is charged by using the power source outside the vehicle immediately before the initial check, and does not prohibit the driving of the vehicle when the failure is detected by the failure detection unit and when the vehicle has started running immediately before the initial check, wherein when the drive prohibition determination unit determines that the vehicle is in a condition capable of performing adequate evacuation drive, the drive prohibition unit does not prohibit the driving of the vehicle, even if the failure is detected by the failure detection unit and the high-voltage battery is charged by using the power source outside the vehicle immediately before the initial check.

2. The control device according to claim 1, wherein the specific failure is a state of failure where it is necessary to switch the driving of the vehicle into limp-home mode driving.

* * * * *